United States Patent
Zecha et al.

(10) Patent No.: US 6,794,466 B2
(45) Date of Patent: Sep. 21, 2004

(54) SHEAR THINNING VINYL ACETATE BASED POLYMER LATEX COMPOSITION, ESPECIALLY FOR ADHESIVES

(75) Inventors: Helmut Zecha, Burghausen (DE); Rudolf Weissgerber, Burghausen (DE); Francis Petrocelli, Allentown, PA (US)

(73) Assignee: Air Products Polymers, L.P., Allentown, PA (US)

( * ) Notice: Subject to any disclaimer, the term of this patent is extended or adjusted under 35 U.S.C. 154(b) by 361 days.

(21) Appl. No.: 10/035,373

(22) Filed: Oct. 19, 2001

(65) Prior Publication Data

US 2003/0109620 A1 Jun. 12, 2003

(51) Int. Cl.$^7$ ............................. C08F 2/38; C08J 3/00; C08K 5/05; C08K 3/20; C08L 11/02

(52) U.S. Cl. .................... 526/85; 524/379; 524/387; 524/388; 524/457; 524/459; 524/503; 524/524; 524/556; 524/557; 524/563; 526/82

(58) Field of Search ................. 524/379, 387, 524/388, 457, 459, 503, 524, 556, 557, 563; 526/85, 82

(56) References Cited

U.S. PATENT DOCUMENTS

| | | | | |
|---|---|---|---|---|
| 4,128,518 A | * | 12/1978 | Oyamada et al. ............ | 524/501 |
| 5,391,608 A | | 2/1995 | Mudge et al. ............... | 524/459 |
| 5,434,216 A | | 7/1995 | Mudge et al. ............... | 524/803 |
| 5,439,960 A | | 8/1995 | Mudge et al. ............... | 524/111 |

FOREIGN PATENT DOCUMENTS

| | | |
|---|---|---|
| DE | 2620738 | 12/1977 |
| EP | 0322175 | 6/1989 |
| EP | 0433957 | 6/1991 |
| EP | 0501174 | 9/1992 |
| EP | 0561221 | 9/1993 |
| EP | 0623661 | 11/1994 |
| EP | 0686683 | 12/1995 |
| EP | 0812863 | 12/1997 |
| EP | 1170311 | 1/2002 |
| JP | 6322337 | 11/1994 |
| JP | 9302004 | 11/1997 |
| WO | 01/00695 | 1/2001 |

OTHER PUBLICATIONS

G. E. Ham, et al., *Vinyl Polymerization*, 1967, vol. I, Chap. 4, pp. 207–329.
M. K. Lindemann, *The Mechanism of Vinyl Acetate Polymerization*.
H. Y. Erbil, *Vinyl Acetate Emulsion Polymerization and Copolymerization with Acrylic Monomers*, CRC Press 2000.
J. Brandrup, et al., *Polymer Handbook*, John Wiley Sons, Inc., 4$^{th}$ Ed., 1999, p 11/97 ff.

* cited by examiner

Primary Examiner—Patrick D. Niland
(74) Attorney, Agent, or Firm—Mary E. Bongiorno

(57) ABSTRACT

The present invention elates to a vinyl acetate based polymer latex composition obtained by emulsion polymerization of:

(a) polyvinyl alcohol,
(c) a monomer mixture comprising vinyl acetate, and (d) optionally one or more additional co-monomer(s), in presence of (c) 0.0001–0.05 wt. % of a chain transfer agent, based on total monomer weight, said vinyl acetate based polymer latex composition having a weight average particle size $\geq 400$ nm and a higher shear thinning factor than the vinyl acetate based polymer latex composition (a), (b) and (d) obtained in the absence of the chain transfer agent (c). According to one embodiment, emulsion polymerization is carried out in presence of 0.001 to 0.05 wt. % of a chain transfer agent selected from the group consisting of aldehydes and chain transfer agents having a similar chain transfer constant with regard to vinyl acetate as the monomer. According to another embodiment, emulsion polymerization is carried out in presence of 0.0001 to 0.01 wt. % of a chain transfer agent selected from the group consisting of thiols, mercapto acids, and chain transfer agents having a similar chain transfer constant with regard to vinyl acetate as the monomer. The invention also relates to an adhesive comprising said vinyl acetate based polymer latex composition. Such adhesive is preferably used in paper and packaging applications or as a wood working adhesive or wood glue.

The invention further relates to a process of manufacture of a vinyl acetate based polymer latex composition having a weight average particle size >400 nm, including emulsion polymerization of vinyl acetate in the presence of polyvinyl alcohol, optionally together with one or more additional co-monomer(s), wherein the emulsion polymerization is carried out in the presence of 0.0001 wt. % to 0.05 wt. % chain transfer agent, based on total monomer weight.

25 Claims, No Drawings

SHEAR THINNING VINYL ACETATE BASED POLYMER LATEX COMPOSITION, ESPECIALLY FOR ADHESIVES

BACKGROUND OF THE INVENTION

Polymer emulsions or polymer latices prepared by conventional emulsion homo- or co-polymerization of vinyl acetate using polyvinyl alcohol as protective colloid are widely used for adhesives. There are several application fields for such emulsions such as in wood glues, paper and packaging adhesives (e.g. case sealing, book binding, bag making, card board lamination), parquet adhesives and others. Most importantly these latices are used in paper and packaging or in woodworking adhesive formulations or wood glues.

All these adhesives and especially woodworking adhesives are optimized with respect to several properties such as water resistance of the bond, heat resistance of the bond and creep of the bond. Further, before application several dispersion properties must be met. These are compatibility with formulation aids such as film forming agents, fillers, metal salts; rheological properties; storage stability; the setting speed and so on.

Vinyl acetate (VAc) based polymer latices for paper and packaging have to meet certain requirements regarding setting speed, penetration into the paper, open time, cohesion of the bond. On the other hand they should possess good re-dispersability of a film to provide good machine cleaning properties.

VAc based polymer latices for woodworking adhesives having good water resistance typically use some functional post-crosslinking co-monomer in polymerization and the formulation with a catalyst afer polymerization. Amongst the post-crosslinkers N-alkylol derivatives of an amide of an α,β-ethylenically unsaturated carboxylic acid, such as N-methylol acrylamide (NMA) which is preferred for latex wood glues are known. For example, U.S. Pat. No. 5,439,960 and U.S. Pat. No. 5,391,608 describe the use of 0.1 to 6% of NMA based on total monomer content Likewise European Patent Application EP-A-0,561,221 describes the use of 2 to 10% NMA.

As the catalyst for formulation of the above woodworking adhesives having good water resistance water-soluble metal salts of monobasic acids such as aluminumm(III), chromium and/or zirconium(IV) salts, especially aluminum nitrate, chromium chloride or zirconium oxychloride are used (see for example DE-26,20,738, EP-A-0,433,957, EP-A-0,501,174, EP-A-0,686,683 and U.S. Pat. No. 5,434,216).

Another approach to improve water resistance of wood glues is for example disclosed in EP-A-0,433,957, EP-A-0,623,661 and JP-06,322,337 which documents relate to use of more hydrophobic co-monomers such as vinyl pivalate, diisopropyl maleate, diisopropyl fumarate, vinyl chloride or versatic acid vinyl esters for this purpose.

Adhesive performance of for example a wood glue is typically controlled by the amount of polyvinyl alcohol, i.e. the ratio of polyvinyl alcohol to monomer, the polyvinyl alcohol molecular weight and its degree of hydrolysis as for example disclosed in U.S. Pat. No. 5,434,216. In addition, functionalized polyvinyl alcohols, e.g. acetoacetylated polyvinyl alcohols or itaconic acid-modified polyvinyl alcohols, or ethylene modified PVOH may be used.

The choice of the polyvinyl alcohol (PVOH) determines other properties of the vinyl acetate latex and thus the adhesive obtained, especially its rheological properties such as viscosity and shear thinning, or the setting speed. Rheology mainly depends on the molecular weight distribution and degree of hydrolysis of the polyvinyl alcohol used, but can be changed by altering product recipe. For example, EP-A-0,686,683 discloses altering the rheological properties by altering the formulation with some thickening agent, thereby changing the continuous phase viscosity, at the expense of an altered recipe.

EP 00 114 097.9, assigned to Air Products Polymers LP, discloses adjustment of rheological properties and expecially reduction of shear thinning of a latex emulsion by increasing particle size of the polymer without changing overall composition. More in detail, the document teaches increasing particle size by carrying out emulsion polymerization of vinyl acetate and optional co-monomers in presence of a pre-crosslinking monomer selected from ethylenically unsaturated monomers such as triallyl cyanurate and allyl methacrylate. The document is silent on the possibility of increasing shear thinning factor.

With the term shear thinning the phenomenon of a viscosity drop with increased shear rate is addressed. Such decrease of viscosity is considered reversible if viscosity reaches the original value when the shear rate is decreased to its original value.

Shear thinning can be quantified by the so called "shear thinning factor" (SF) which is obtained as the ratio of viscosity measured by Brookfield viscosimeter at 1 rpm, Bf(1), and at 10 rpm, Bf(10):

$$SF=((Bf1/Bf10)-1).$$

A shear thinning factor below zero (SF<0) indicates shear thickening, a shear thinning factor of zero (SF=0) indicates Newtonian behavior and a shear thinning factor above zero (SF>0) stands for shear thinning behavior. Shear thinning factors$\neq$0 reflect properties of emulsions with high solids content as is typically the case for VAc based latices. Non-Newtonian behavior is in general no problem at lower solids contents (e.g. below 40%).

It is an object of the present invention to find a possibility for independent control of the shear thinning factor which in turn allows to precisely and intentionally adapt the emulsion or latex for certain applications thereby improving performance of for example a paper and packaging adhesive or of a woodworking adhesive or wood glue.

In several cases it would be especially useful and desirable to control shear thinning i.e. the shear thinning factor and to provide the desired extend of it. More specifically, it would in the first place be desirable to avoid any shear thickening i.e. to be in the position to shift the shear thinning factor from negative to positive values (SF>0). Performance requirements for a paper and packaging adhesive are, however, typically a SF within the range of $0.1<SF\leq1.5$ dependent on the specific application, whereas performance requirements for a wood glue are typically a SF in the range of $0.1<SF\leq0.6$. In any case shear thickening (SF<0) is preferably to be avoided.

Additionally, the requirements for setting speed and cohesion must be fulfilled: In the case of a paper and packaging adhesive setting speed measured as AZG in seconds should be:<4 s, whereas cohesion measured at 70° C. should be$\leq$4 $N/mm^2$.

In the case of a woodworking adhesive (wood glue) the setting speed measured as bond strength after 2.5 minutes gluing time should be>1.5 $N/mm^2$. Cohesion of the wood bond measured as bond strength at 80° C. should be>6 $N/mm^2$.

Other useful adhesive performance parameters created e.g. by the level of co-monomer such as NMA, and/or by the amount of PVOH and/or by its molecular weight and hydrolysis distribution, should remain more or less unchanged.

It is thus another object of the invention to provide a wood glue which meets the above requirements and has improved water resistance.

BRIEF SUMMARY OF THE INVENTION

The above objects are solved and the drawbacks of the prior art are overcome according to a first aspect of the invention by a vinyl acetate based polymer latex composition obtained by emulsion polymerization of:

(a) polyvinyl alcohol,
(b) a monomer mixture comprising vinyl acetate, and optionally (d) one or more additional co-monomer(s), in presence of (c) 0.0001 to 0.05 wt. % (1 to 500 ppm) of a chain transfer agent (CTA), based on total monomer weight, said vinyl acetate based polymer latex composition having a weight average particle size≧400 nm and a higher shear thinning factor than the vinyl acetate based polymer latex composition obtained in the absence of the chain transfer agent.

According to a first embodiment the emulsion polymerization is carried out in presence of 0.001 to 0.05 wt. % of a chain transfer agent selected from aldehydes, especially $C_{2-5}$-aldehydes and other CTAs having a similar chain transfer constant with regard to VAc as the monomer.

According to a second embodiment the emulsion polymerization is carried out in presence of 0.0001 to 0.01 wt. % of a chain transfer agent selected from thiols, especially $C_{2-5}$-thiols, mercapto acids, especially $C_{2-5}$-mercapto acids and other CTAs having a similar chain transfer constant with regard to VAc as the monomer.

The latex of the invention preferably has a shear thinning factor of about 1,2 to 3,5 times the shear thinning factor of a latex composition obtained in absence of the chain transfer agent or wherein the shear thinning factor is shifted from negative values to positive values as compared to the shear thinning factor of a latex composition obtained in absence of the chain transfer agent.

Preferably, the latex weight average particle size is about 60 to 95% the weight average particle size of a latex composition obtained in the absence of the chain transfer agent.

Preferably, the chain transfer agent is selected from the group consisting of aldehydes, preferably $C_{2-5}$-aldehydes, thiols, preferably $C_{2-5}$-thiols, mercapto acids, preferably $C_{2-5}$-mercaptoacids, and mixtures thereof. More preferably the chain transfer agent is selected from the group consisting of acetaldehyde, croton aldehyde, propionic aldehyde, 2-mercapto propionic acid, 3-mercapto propionic acid, and mixtures thereof.

The amount of vinyl acetate is preferably in the range of 100 wt. % to 60 wt. %, based on total monomer weight.

According to an especially preferred embodiment the vinyl acetate based polymer latex composition is a copolymer of vinyl acetate/N-methylol acrylamide, optionally further including versa tic acid vinyl ester having 9 to 13 carbon atoms from the carbonic acid group. The chain transfer agent is then preferably a mercaptopropionic acid.

According to a second aspect the present invention relates to a process of manufacture of a vinyl acetate based polymer latex composition having a weight average particle size≧400 nm, including emulsion polymerization of vinyl acetate in the presence of polyvinyl alcohol, optionally together with one or more additional co-monomer(s), wherein the emulsion polymerization is carried out in the presence of 0.0001 to 0.05 wt. % of a chain transfer agent, based on total monomer weight. Preferably the chain transfer agents and the amounts used are as defined above.

According to a third aspect the present invention relates to an adhesive, comprising the vinyl acetate based polymer latex composition as defined above.

According to a preferred embodiment the adhesive is for use as a fast setting adhesive for paper and packaging, said adhesive comprising a vinyl acetate homopolymer latex composition.

According to another preferred embodiment the adhesive is for use as a wood glue and comprises a vinyl acetate based polymer latex composition of a copolymer of vinyl acetate/N-methylol acrylamide, optionally further including versatic acid vinyl ester having 9 to 13 carbon atoms from the carbonic acid group. The chain transfer agent is preferably mercapto propionic acid.

DETAILED DESCRIPTION OF THE INVENTION

The present invention is based on the surprising finding that the shear thinning factor of a vinyl acetate based polymer latex prepared by conventional emulsion polymerization using PVOH as a protective colloid can be increased without substantially changing the latex composition, especially without changing the type and/or amount of PVOH. This can be achieved by polymerizing the vinyl acetate in presence of a small amount of a chain transfer agent without a significant change of the average molecular weight, measured as the K-value. Thereby other important adhesive properties, such as cohesion, remain unchanged, whereas the shear thinning may be adjusted as desired and/or a shear thickening may be even reversed to shear thinning.

More in detail, the invention to a first aspect thereof thus relates to a vinyl acetate based polymer latex composition obtained by emulsion polymerization of:

(a) polyvinyl alcohol,
(b) a monomer mixture comprising vinyl acetate, and optionally (d) one or more co-monomer(s), in presence of (c) 0.0001 to 0.05 wt. % (1 to 500 ppm) of a chain transfer agent, based on total monomer weight, said vinyl acetate based polymer latex composition having a weight average particle size ≧400 nm. The resulting VAc based polymer latex composition has a higher shear thinning factor than the VAc based polymer latex of the same composition (a), (b) and optionally (d) which is obtained in absence of the chain transfer agent (c). At the same time, the K-value indicating molecular weight is surprisingly slightly increased or remains about comparable.

The use of a chain transfer agent (CTA) in emulsion polymerization of VAc monomers is well known in the art and is described in textbooks, e.g. "Vinyl Polymerization", edited by George E. Ham, Marcel Dekker, 1967, Vol. I, Chapter 4, pages 207–329: M. K. Lindemann, "The Mechanism of Vinyl Acetate Polymerization" or "Vinyl Acetate Emulsion Polymerization and Copolymerization with Acrylic Momnomers" by H. Y. Erbil, CRC Press 2000.

The latter textbook teaches that CTAs can be included in emulsion polymerization to terminate propagating polymer chains and to prevent polymer chains from growing too large, which may create problems in subsequent applications. Changing the concentration of such modifiers or CTAs during emulsion polymerization leads to control of average molecular weight, molecular weight distribution, branching, and crosslinking of the polymer. The extend of chain transfer can be predicted if the chain transfer constants $C_X$ are known for a given monomer system.

Chain transfer constants $C_X$ may be obtained as explained e.g. in the "Polymer Handbook", edited by J. Brandrup, E. H. Immergut, and E. A. Grulike, John Wiley Sons, Inc., 4. Edition, 1999, page II/97 ff. Various transfer constants of vinyl acetate to different species are given there. As known radical transfer of a growing polymer chain may occur to any species involved in the polymerization: monomer; polymer; protective colloid, such as PVOH; emulsifier, if used; initiator; solvent, if is used; or additives called chain transfer agents. Chain transfer constants of a certain species ($C_X$), may be different by several orders of magnitude in different monomer systems.

Examples of CTAs used in VAc based latices include, but are not limited to mercaptanes/thiols, aldehydes, chlorinated aliphatics and so on. The CTAs are usually characterized by their chain transfer constant. To effect chain transfer CTAs are typically used in appreciable amounts. For example EP 0,332,175 discloses the use of chain transfer agents in emulsion polymerization of VAc based polymer latices. The specific chain transfer agents described in said document are used in an amount of 0.1 to 0.7 wt. %. The resulting polymer latices are disclosed to show an improved setting speed.

WO 01/00 695 discloses a method for radically initiated, aqueous emulsion polymerization for producing an aqueous polymer dispersion with polymer particles having a weight average particle diameter $\leq 300$ nm. According to said method, at least one monomer with at least one ethylenically unsaturated group, preferably an acrylic monomer, is dispersed in an aqueous medium and polymerized using at least one radical polymerization initiator in the presence of at least one radical chain transfer agent (<5 wt. %) with a solubility greater than $1 \times 10^{-5}$ mol per kilogram water at 20° C. and at 1 bar (absolute). The resulting dispersions have a solids content of about 20–30 wt. %

When CTAs were used in emulsion polymerization, as given above (EP-A-0,322,175; JP-A-9,302,004; WO-A-01/00695; EP-A-0,812,863) it was accepted or it was even a goal (JP-A-9,302,004) that the molecular weight of the obtained polymer decreased. As is well known in the art, such drop of molecular weight has a negative impact on the cohesion of a bond prepared by such lower molecular weight polymer. Only in few cases, e.g. for pressure sensitive adhesives, the lower molecular weight may influence tack and adhesion in the desired direction and the resulting loss of cohesion is acceptable.

It was surprising to find that, upon use of trace amounts of a CTA, smaller final particle sizes are obtained which cause more shear thinning or which may even change a shear thickening behavior to a shear thinning one. At the same time, and even more surprisingly it was found, that latices polymerized in the presence of traces of one or more CTAs showed a clear tendency to faster setting speed.

For PVOH stabilized VAc based polymer latices, when used as adhesives, a too low molecular weight would decrease the cohesion of the bond. For these types of adhesives high cohesion is required, which should be also sufficiently high enough at higher temperatures, named then as heat resistance. CTAs are therefore generally considered disadvantageous in such compositions.

It has surprisingly and unexpectedly been discovered that the introduction of trace amounts of a CTA did not decrease the molecular weight of the resulting polymer, characterized by the K-value, but that the opposite was observed. Astonishingly, these effects can be obtained for both VAC homopolymers and VAC copolymers comprising additional co-monomers such as e.g. NMA, ethylene and/or versa tic acid esters.

The chain transfer agent for use in the invention may be selected from the group consisting of aldehydes, preferably $C_2$–$C_5$-aldehydes, such as acetaldehyde, propionic aldehyde, butyraldehyde, croton aldehyde, and n-pentanal; thiols, preferably $C_2$–$C_5$-thiols such as ethanthiol, propanthiol, mercaptoethanol, 2- or 3-mercaptopropanol, 1- or 2-n-butane-thiol, and n-pentanethiol; and mercaptoacids, preferably $C_{2-5}$-mercaptoacids, such as 2- or 3-mercapto propionic acid, and 2- or 3-mercapto butyric acid and mixtures thereof, mercapto acids being preferred. More preferably the chain transfer agent used in the present invention is selected from the group consisting of acetaldehyde, propionic aldehyde, croton aldehyde, 2- and 3-mercapto propionic acid, and mixtures thereof. Most preferably the chain transfer agent is a mercapto propionic acid (MPA). Mixtures of CTAs may be used, provided the respective CTAs do not negatively interfere with each other.

The amount of CTA used according to the present invention is in general in the range of 0.0001 to 0.05 wt % (1 to 500 ppm), based on total monomer content, preferably 0.001 to 0.05 wt. % (10 to 500 ppm). According to one embodiment the emulsion polymerization is carried out in presence of 0.001 to 0.05 wt % (10 to 500 ppm), preferably 0.001 to 0.02 wt. % and most preferably 0.001 to 0.01 wt. %, of a chain transfer agent selected from the group consisting of aldehydes and CTAs having a similar chain transfer constant with regard to VAc as the monomer. According to an alternate embodiment the emulsion polymerization is carried out in presence of 0.0001 to 0.01 wt % (1 to 100 ppm), preferably 0.0001 to 0.005 wt. %, and most preferably 0.001 to 0.0025 wt. %, of a chain transfer agent selected from the group consisting of thiols, mercapto acids, and CTAs having a similar chain transfer constant with regard to VAc as the monomer. All percentages are based on total monomer content. With the term "similar" as used above a chain transfer constant is addressed which with regard to VAc under polymerization conditions is in the same order of magnitude and preferably only slightly differs from the one of an aldehyde, thiol and mercaptoacid, respectively.

The resulting polymer latex has a weight average particle size of $\geq 400$ nm. Preferably such particle size is in the range of 500 to 1500 nm, more preferably 650 to 1500 nm, most preferably 700 to 1200 nm. Solids content of the emulsion is preferably equal to or above 40 wt. %, more preferably in the range of 45 to 70 wt. %, most preferably in the range of 50 to 65 wt. %. At these high solids contents shear thinning or thickening, which is of no concern for polymer latices containing less solids (<40 wt. %), needs to be paid careful attention. The shear thinning factor can be carefully and independently adjusted by the method of the invention.

The CTA may be added to the initial reactor charge, before polymerization is started by adding the initiator, or may be fed to the reactor during the course of the polymerization. Conventional emulsion polymerization may be used as e.g. described in EP 00 114 097.9.

The polymer latex of the invention comprises vinyl acetate as the base monomer. Vinyl acetate is used in an amount of 100 to 60.0% by weight, based on total monomer content. Preferably, the amount of vinyl acetate used is in the range of 100 to 80% by weight. According to one embodiment the VAc based polymer latex may be a VAc homopolymer latex. These VAc homopolymer latices can advantageously be used for paper and packaging applications. The VAc based latex composition may also be a co-polymer composition. In this case one or more co-monomers selected from the following may be copolymerized with VAc: one or more post-crosslinking monomer(s), one or more vinyl ester(s), one or more ethylenically unsaturated acid(s) or anhydride(s) thereof, one or more acrylic acid(s), ethylene and mixtures of the foregoing.

If e.g. designed for wood glues the vinyl acetate based polymer latex of the invention, preferably comprises a post-crosslinking monomer selected from the group consisting of N-alkyol derivatives of an amide of an $\alpha,\beta$-ethylenically unsaturated carboxylic acid and mixtures thereof. Preferably the post-crosslinking monomer is selected from the group consisting of $N-C_{1-3}$-alkylol (meth)acrylamides, preferably N-methylol (meth)acrylamide, $N-C_{1-3}$-alkylol melamides, preferably N-methylol melamide, $N-C_{1-3}$-alkylol melamic acid and their esters, preferably N-methylol melamic acid, N-methylol melamic acid ester, $N-C_{2-5}$-acylol amides of vinylaromatic acids, $N-C_{1-4}$-alkoxymethyl (meth)acrylamide, and mixtures thereof. More preferably, the post-crosslinking monomer is N-methylol acrylamide (NMA).

With the term "(meth)acryl. . ." as used herein both the respective acrylic acid derivatives and the methacrylic acid derivatives are referred to. Thus, "N-methylol (meth) acrylamide" refers to both N-methylol acrylamide and N-methylol methacrylamide. The above $C_{1-3}$ or $C_{1-4}$ alkly residues include methyl, ethyl, n-propyl, i-propyl, n-, i-, and t-butyl residues and may be chosen independently from each other.

The post-crosslinking monomer is preferably comprised in the vinyl acetate based polymer latex composition of the invention in an amount of 0.1 to 5.0% by weight based on the total monomer content The post-crosslinking monomer or mixtures of such monomers is known to be essential for sufficient water and heat resistance of the bond. Use of such post-crosslinking monomer or monomer mixtures is therefore preferred. It is, however, not necessary to achieve the effects of the invention. Therefore, although preferred, the post-crosslinking monomer is not an essential component of the claimed latex composition.

The vinyl acetate based polymer latex composition of the invention may comprise the above one or more copolymerizable co-monomers in the following amounts: up to 40% by weight vinylic ester, up to 15% by weight acrylic monomer, up to 3% by weight unsaturated carboxylic acid, and up to 30% by weight ethylene, all percentages being based on total monomer content, or mixtures thereof, provided the total amount of copolymerizable co-monomers does not exceed 50% by weight.

Vinyl esters other than VAc which may be used in combination with vinyl acetate are for example vinyl propionate, vinyl pivalate, vinyl laurate, vinyl 2-ethyl hexanoate, dibutyl maleate, dioctyl maleate, diisopropyl maleate, diisopropyl fumarate, versa tic acid vinyl esters having 9 to 13 carbon atoms from the carbonic acid group, preferably 9 or 10 carbon atoms, or mieeuees thereof The amount of other vinyl esters, if used, is in the range of up to 40.0% by weight, based on total monomer content, preferably 3 to 30% by weight.

The acrylic monomer to be optionally comprised in the vinyl acetate based polymer latex composition of the invention may for example be selected from the group consisting of $C_{1-8}$-alkyl acrylates such as ethyl acrylate, butyl acrylate, 2-ethyl hexyl acrylate or mixtures thereof. The acrylic monomer is preferably used in an amount of less than 15% by weight based on total monomer content, more preferably in an amount of 1 to 10% by weight.

The above unsaturated carboxylic acid as the co-monomer is an ethylenically unsaturated acid and may be selected from the group consisting of acrylic acid, methacrylic acid, croton acid, itaconic acid, maleic acid, fulmaric acid, their anhydrides such as maleic acid anhydride, and mixtures thereof. If used, the amount of the ethylenically unsaturated carboxylic acid or their mixtures is 0.1 to 3.0% by weight, preferably 0.5 to 2.0% by weight, based on total monomer content.

The vinyl acetate based polymer latex composition may further comprise up to 30% by weight ethylene, preferably 1 to 20% by weight ethylene based on total monomer contents. In a preferred embodiment, the vinyl acetate based polymer latex composition, which may optionally comprise the above post-crosslinking monomer, comprises one or both of 1 to 20% by weight ethylene and 1 to 30% by weight vinyl ester as the copolymerizable co-monomers, provided the total amount of copolymerizable co-monomer does not exceed 1 to 40% by weight.

The colloidal stabilizer used in the vinyl acetate based polymer latex compositions of the invention is polyvinyl alcohol (PVOH). Various suitable polyvinyl alcohols are known to the skilled worker and are readily available. Especially preferred is a partially hydrolyzed PVOH having a degree of hydrolysis from 60 to 99 mol %, preferably from 80 to 97 mol %, most preferably 86 to 94 mol %. To achieve the desired viscosity level of the polymer latex and to allow for good adhesion performance of the bond, blends of different PVOH grades possessing different molecular weights and hydrolysis distributions may be used. The colloidal stabilizer PVOH is typically used in an amount of 3 to 15% by weight, based on the total weight of the composition, more preferably 4 to 11% by weight.

As put forth above, the PVOH is typically chosen to provide desired performance of the latex and/or the adhesive comprising the same, respectively. Rheological properties of the latex/adhesive likewise depend in part on the choice of the PVOH, but can be controlled independently by the use of CTAs according to the invention. This use of trace amounts of CTAs according to the invention results in reduced shear thickening, in trans ferring a shear thickening into a shear thinning one, or in more shear thinning i.e. in an increased of the shear thinning factor SF. Such change of rheological properties of vinyl acetate based polymer lattices using PVOH as the protective colloid, however, seemed to be impossible without changing the amount or the molecular properties of the PVOH The polymer latex particles may be co-stabilized by use of emulsifiers, if needed. These emulsifiers are known to the skilled worker and can be included as usual. Preferably, non-ionic emulsifiers such as polyoxyethylene ethers or fatty alcohols may be used, preferably in an amount of 0.1 to 1.0% by weight, based on total monomer content.

In a second aspect the present invention relates to a process of manufacture of a vinyl acetate based latex composition having a weight average particle size $\geq 400$ nm, including emulsion polymerization of vinyl acetate in the presence of polyvinyl alcohol, optionally together with one or more additional co-monomer(s), wherein the emulsion polymerization is carried out in the presence of 0.0001 wt. % to 0.05 wt % of a chain transfer agent, based on total monomer weight. The chain transfer agents(s) and the amounts used are as defined above.

The vinyl acetate based polymer latex composition of the invention may be obtained by conventional emulsion polymerization. Conventional batch or semi-batch emulsion polymerization procedures may be employed. Mainly for safety reasons and in view of the amount of heat to be dissipated, the semi-batch procedure is preferred. In case of a semi-batch procedure a certain fraction of the reactants together with some water, if desired, and some of the polyvinyl alcohol solution as well as emulsifier solution, if used, is initially charged to the reactor.

The reaction may be stated by feeding an aqueous solution of the initiator or initiator components. Preferred initiation of the emulsion polymerization of the invention is carried out by a redox reaction using a redox system of an oxidant and a reductant in suitable amounts, the amount of initiator components to provide complete conversion depending on the selected initiator of the redox system. Typical oxidants are selected from the group of $H_2O_2$, organic hydroperoxides such as t-butyl hydroperoxide (tBHP), inorganic persulfates such as sodium persulfate, potassium persulfate and ammonium persulfate. Other organic peroxides may be used as well either alone or in combination therewith. Typical reductants are the sulfoxylates such as sodium formaldehyde sulfoxylate (SFS), sulfites such as sodium sulfite, sodium hydrogen sulfite, dithionites such as sodium dithionite, and organic reductants such as ascorbic acid and its derivatives. Preferred combinations are t-butyl hydroperoxide or hydrogen peroxide and sodium formaldehyde sulfoxylate (optionally in the presence of traces of ferro ammonium sulfate), t-BHP or $H_2O_2$- and sodium sulfite, t-BHP or $H_2O_2$ and sodium hydrogen sulfite, t-BHP or $H_2O_2$ and sodium dithionite, t-BHP or $H_2O_2$ and ascorbic acid, t-BHP or $H_2O_2$ and erythorbic acid. Thermal initiation by $H_2O_2$ or other peroxides may also be applied.

Preferably, initiation of the emulsion polymerization is carried out by t-BHP or $H_2O_2$ and SFS in the presence of traces of ferro ammonium sulfate. The initiator is used in suitable amounts to provide complete conversion of the monomers. In case of the preferred initiation system typically less than 0.015% by weight t-BHP, based on total monomer content, for the course of the polymerization and less than 0.15% by weight t-BHP, based on total monomer content, for post-polymerization to reduce the residual monomer content below 50 ppm, based on the emulsion, is used. Molar ratios of the SFS are used during the course of the polymerization, typically, but are not desired.

Further on, the remaining fractions of the reactants, the PVOH solution as well as the emulsifier solution, if used, and extra water, if needed, are fed over a certain period of time to the reaction vessel. Feeding rates will typically be kept constant over the feeding time, but may also vary, if desired. Typical reaction times depend on the reaction temperature and are typically within the range of 2 hours to 8 hours, preferably 4 hours to 6 hours.

The polymerization reaction of the invention is preferably performed at a temperature ranging from 50 to 90° C., preferably between 60 and 80° C., during most of the reaction time. Care has to be taken that an appropriate mixing of the components occurs in the reaction vessel. Mixing is achieved by conventional means known to the skilled worker. Initial reactor charges and procedure can be chosen as needed.

The initiator components will be fed to the reactor during all the reaction time, even after the feeding of reactants is finished until nearly complete conversion is reached. The initiator feeding rate may be kept constant or may vary over the time. For post-polymerization which is preferably carried out to reduce residual monomer content below 500 ppm based on the latex, more concentrated solutions of initiator components (preferably t- BHP/SFS) are fed to the latex. Finally the latex is cooled to ambient temperature.

Final latex viscosity at 50% solids by weight will be between 1,000 and 40,000 mPas, mainly but not only depending on the type and amount of polyvinyl alcohol used. Viscosity is measured using a Brookfield viscometer at 20 rpm at 23° C.

The vinyl acetate based polymer latex composition of the invention thus obtained may be formulated into an adhesive by conventional means. In a third aspect the present invention thus relates to an adhesive comprising the above VAc based polymer latex composition. Optionally such adhesive may comprise suitable additives known to the skilled worker. Examples of such additives are plasticizers, antiblocking agents, film forming agents; water-soluble metal salts of monobasic acids such as aluminum, chromium and/or zirconium salts; free mineral acids such as hydrochloride acid, nitric acid, perchloric acid, phosphoric acid or mixtures thereof and antifoam agents (defoamers), biocides, and so on. For the use as a water resistant wood glue the formulation with metal salts, such as aluminum, chromium and/or zirconium salts; free mineral acids, such as hydrochloric acid, phosphoric acid or mixtures thereof is preferred.

The adhesives of the invention may be characterized as follows:

Paper and packaging adhesives:
- A shear thinning factor SF in the range of $0.1<SF \leq 1.5$ dependent on the desired application.
- A setting speed measured as AZG in seconds of AZG<4 s.
- A cohesion measured at 70° C. of 24 N/mm².

Water resistant wood glues:
- A shear thinning factor SF in the range of $0.1<SF \leq 0.6$.
- A setting speed measured as bond strength after 2.5 minutes gluing time of>1.5 N/mm².
- A cohesion measured at 80° C. of>6 N/mm².
- Water resistance of a wood glue of performance group D3: D3>2 N/mm² and water resistance of a wood glue of performance group D4: $D3 \geq 4$ N/mm² and $D4 \geq 4$ N/mm².

Properties of latices were measured by the following test methods.

Test Methods

Latex Particle Size:

Final latex particle size distributions were obtained either using the COULTER LS230, or using the COULTER N4, both supplied by Coulter Cooperation, Miami, Florida 33196. Samples of the final latex were diluted to appropriate concentration using pure distilled water.

Coulter LS230 measurement is based on light diffraction combined with some static light scattering and provides a particle size distribution. As the larger particles are overestimated by this instrument, the median of the volume distribution function was chosen to characterize an average particle size.

Coulter N4 measurement is based on dynamic light scattering detected at 90 degrees scattering angle. The weight average was used to characterize particle size. Each value was obtained as an average of 3 measurements.

Latex Viscosity and Shear Thinning:

Latex viscosity was measured using Brookfield viscosimeter. Viscosity data were taken for 1, 10 and 20 RPM. The latex viscosity is given for 20 RPM (Bf 20) in mPas. To characterize the non-Newtonian behavior a shear thinning factor SF is calculated from the viscosity at 1 and 10 RPM: SF=((Bf1/Bf10)−1). A shear thinning factor SF>0 indicates shear thinning whereas SF<0 stands for shear thickening. All measurements were carried out at 23° C.

Testing of K-value:

A latex sample was one weighed to obtain 1 gram of polymer (not including the PVOH). This sample was diluted with 5 ml of pure water. 90 ml of tetra hydrofurane (THF) were slowly added under stirring to give a clear polymer solution at room temperature. Additional pure water was then added to obtain a total amount of 100 ml solution. The viscosity of the homogeneous solution was estimated using an Ubbelohde viscosimeter. Calculation of viscosity included the Hagenbach correction. The same was carried out for a solution representing the solvent including the right amount of PVOH and 90 gram of THF. The "Eigenviscosity" k was then calculated based on the Fikentscher Equation. The K-value is then defined by K=$10^3$k. It represents a simple viscosimetric average of the polymer molecular weight.

Wood Working Adhesive Formulation:

Base latices, which were polymerized as explained below, were formulated to provide the wood working adhesive formulation. Butyl carbitol acetate was used as a film forming agent (2,6 parts per 100 parts of latex). Alumium chloride hydrate was then added as a catalyst (3.5 parts of a 50% solution per 100 parts of emulsion for testing the D3-value, or 5 parts of a 50% solution for testing the D4-values). The components were mixed at ambient temperature. The wood specimens were glued within 1 to 5 days after preparation of the formulation.

Bond Strength in Accordance with DIN EN 204/205:

Test specimens were produced in accordance with DIN EN 205. For this purpose pairs of beech wood panels, each 5 mm thick, 130 mm wide and 600 mm long, were bonded to one another with the adhesive formulation to be tested under a pressure distributed uniformly over the bond area and were stored in accordance with DIN EN 204. Following storage, the bonded panels were divided into test specimens each measuring 150 mm in length, and these test specimens were used to determine the bond strength in the tensile shear test. In this test the bonded specimens were pulled apart using a tensile testing machine at a pulling rate of 50 mm/min and were stressed until they broke. On fracture, the maximum force $F_{max}$ which occurred at that point was determined. The bond strength T is calculated in accordance with DIN EN 205 from T=$F_{max}$/A, where A is the bonded test area Results are given in N/mm$^2$.

For testing of allocation to performance group D3, the specimens, after gluing, were stored under standard climatic conditions (23° C., 50% atmospheric humidity) for 7 days and then stored in cold water at 20° C. for 4 days. For testing of allocation to performance group D4, the specimens, after gluing, were stored under standard climatic conditions (23° C., 50% atmospheric humidity) for 7 days and then stored for 6 hours in boiling water, followed by 2 hours in cold water at 20° C. Allocation to performance group D3 requires to achieve a D3-value≧2 N/mm$^2$. Allocation to performance group D4 requires to achieve a D4-value≧4 N/mm$^2$ and a D3-value≧4 N/mm$^2$.

Testing of Cohesion at 70° C.

As test specimens, plywood panels (made from beech wood) each 4 mm thick, 30 mm wide and 135 mm long were bonded to one another with an overlapping length of 30 mm using the adhesive dispersion tested. The glued area is 30 mm to 30 mm i.e. 900 mm$^2$. The coating weight of adhesive applied is 100 g each side. The specimens are put together and stored for 1 minute without pressure followed by a clamping pressure of 0.2 N/mm$^2$ applied for a time of 30 minutes. After a storage of 7 days at 23° C./50% rel. humidity, the test specimens were stored for 4 hours at a temperature of 70° C. in an oven preheated to 70° C. Directly following hot storage, the cohesion at 70° C. was determined in a tensile shear test, in which the bonded test specimens were pulled apart using a tensile testing machine at a pulling speed of 50 mm/min and were stressed until they broke. On fracture, the maximum force $F_{max}$ which occurred at that point was determined. The cohesion or thermal stability τ is calculated from τ=$F_{max}$/A, where A is the bonded test area. Final results are mean values from 6 single specimens and are given in N/mm$^2$. Performance requirement is to achieve a bond strengt≧4 N/mm$^2$.

Testing of Cohesion at 80° C.:

As test specimens, pairs of beech wood panels each 5 mm thick, 125 mm wide and 325 mm long were bonded to one another using the respective adhesive dispersion, under a pressure distributed uniformly over the bond area Following storage, the bonded panels were divided into test specimens each measuring 150 mm in length and 20 mm in width. After the test specimens had been prepared they were stored at a temperature of 80° C. in an oven preheated to 80° C. Directly following hot storage, the thermal stability was determined in the tensile shear test on the lines of DIN EN 205, in which the bonded test specimens were pulled apart using a tensile testing machine at a pulling speed of 50 mm/min and were stressed until they broke. On fracture, the maximum force $F_{max}$ which occurred at that point was determined. The cohesion or thermal stability τ is calculated from τ=$F_{max}$/A, where A is the bonded test area Results are given in N/mm$^2$. Performance requirement is to achieve a bond strength≧6 N/mm$^2$.

Testing the Setting Speed After 2.5 min Setting Time:

In a manner similar to the procedure for testing the bond strength, pairs of oak panels each 5 mm thick, 20 mm wide and 150 mm long were bonded using the respective adhesive dispersions, with a pressure distributed uniformly over the bond area. The bond area was 20 mm*20 mm. Bond strength was determined in the tensile shear test after 2.5 minutes, where after the bonded test specimens were pulled apart using a tensile testing machine at a pulling speed of 50 mm/min and were stressed until they broke. On fracture, the maximum force $F_{max}$ which occurred at that point was determined, and was used in turn to determine the bond strength at setting time t by $T_\tau$=$F_{max}$/A, where A is the bonded test area Results are given in N/mm$^2$. Performance requirement is to achieve bond strength>1.5 N/mm$^2$ after 2.5 min.

Testing the Setting Speed According to the AZG-Method:

During the setting of a dispersion based adhesive the strength of the bond increases. The setting can be described by measuring the change of bond strength with time. In the AZG-Method the time is determined necessary that a bonding area of 1 cm$^2$ resists to a load of 2 N applied vertical to the bond surface. For formation of the bond 50$\mu$ of the adhesive are applied to a standard cardboard and a 1 cm$^2$ piece of cardboard is glued against the adhesive coating. After predetermined time the resistance of the bond against the load of 2 N is tested As result the bond resists or it fails. The whole test is made in an automated device. The test procedure is repeated as often as necessary to find the shortest time needed to resist to the load of 2 N. This time is called AZG value. Results are given in seconds. Performance requirement is to achieve an AZG-value>4 s.

The following examples are given to further illustrate the present invention, but are not intended to limit the same.

EXAMPLES

All examples given below were executed in a 3 l glass reactor, equipped with electronic temperature measurement and control, reflux condenser, and metering pumps for at least four different feeds for parallel feeding. Mixing was achieved either by using an anchor-type stirrer at 150 rpm, constantly, or stirrer speed was increased to 180 rpm during the monomer feed period. Few experiments were carried out using a cross-beam type stirrer with inclined blades at 400 rpm.

The ingredients of the recipe were distributed among initial reactor charge, feed 1, feed 2, feed 3, feed 4, and feeds 5 and 6, if applied. The amount of the ingredients was chosen to give a final latex of 1800 to 2500 g. The initial reactor charge was heated and feed 1 (and 2, if used) was (were) started at approximately 55° C. to initiate the reaction. Feeds 3 and 4 were started at 65° C. and were metered in during 50 to 180 minutes. Reaction temperature was maintained between 65 and 80° C. during the addition of feeds 3 and 4. It was up to 80° C. to 90° C. for the last hour where the remaining feed 1 (and 2, if used) were added completely, after feeds 3 and 4 were finished The free monomer content based on latex after the start of feeds 3 and 4 was controlled by appropriate addition rates for feeds 1, 2, 3, and 4 to be between 2 to 15%. Feed 5 and 6, if applied, are added after feeds 1 and 2 have been completed. The product was cooled to ambient temperature under stirring at 100 rpm and application of a vacuum. If necessary, a small amount of defoamer was added.

Example 1 (Comparison A)

Initial reactor charge consisted of 29 parts of a 10% PVOH solution and 12.2 parts of water. PVOH used had a weight average of molecular mass distribution of $M_w=103\ 000$ g/Mol and a number average of $M_n=50\ 400$ g/Mol. The average degree of hydrolysis was 89%. pH value was adjusted to 5.8 by addition of 0.02 parts of 10% NaOH. 13.1 parts of a VAC monomer were added and finally 0.08 parts of a 1% Ferro ammon sulfate solution were added just before the start of feed 1 and feed 2.

Feed 1 consisted of 2.7 parts of a 0.3% hydrogen peroxide solution and feed 2 consisted of 2.7 parts of a 1.3% SFS solution. Feed 3 consisted of 40 parts of VAC monomer. Post polymerization was done by feeds 5 and 6 consisting of 0.1 parts of a 10% tBHP and of 0.1 parts of a 10%o SFS solution, respectively.

No other feeds were applied. The resulting latex (100 parts) provided a solid content of 56% for 100% monomer conversion. Reaction was executed as given above. Final latex had a Brookfield viscosity of Bf20=2 600 mPas.

Example 2

Same as example 1, but 12.5 parts per million of 3-mercapto propionic acid (MPA) based on mass of VAC monomer was added to the initial reactor charge. The final latex had a Brookfield viscosity of Bf20=5 700 mPas. Shear thinning was improved, as indicated by the larger SF-value compared to example 1. Setting speed was improved as indicated by the drop of the AZG-value compared to example 1.

Example 3

Same as example 1, but 25 PPM of MPA based on mass of VAC monomer was added to the initial reactor charge. The final latex had a Brookfield viscosity of Bf20=6 500 mnPas. Setting speed was improved as indicated by the drop of the AZG-value compared to example 1.

Example 4 (Comparison B)

Initial reactor charge consisted of 26 parts of a 10% PVOH solution and 16 parts of VAC monomer. PVOH used had a weight average of molecular mass distribution of $M_w=127\ 800$ g/Mol and a number average of $M_n=69\ 400$ g/Mol. The average degree of hydrolysis was 87%. Reaction was started at 60° C. by addition of 0.08 parts of a 20% $H_2O_2$ solution.

Feed 1 consisted of 2.2 parts of a 0.4% $H_2O_2$ solution. It was started 5 min after the initial $H_2O_2$ addition together with feed 3. This feed 1was continuously charged for 480 min. Feed 3 consisted of 46.3 parts of VAC monomer. It was fed for 360 min. Feed 4 consisted of 8.8 parts of pure water which was started 60 min after start of feed 3 and which was metered in for 240 min.

Post polymerization was done by feeds 5 and 6 consisting of 0.27 parts of a 10% tBHP and of 0.27 parts of a 10% SFS solution, respectively. Both feeds were added after feeds 1 and 2 were completed and after a 1% ferro ammon sulfate (FAS) solution of 0.07 parts was added.

No other feeds were applied. The resulting latex (100 parts) provided a solid content of 65% for 100% monomer conversion. Reaction was executed as given above. The final latex had a Brookfield viscosity of Bf20=33 500 mPas.

Example 5

Same as example 4, but 200 PPM of croton aldehyde was added to the initial reactor charge. The final latex had a Brookfield viscosity of 20 500 mPas.

Example 6

Same as example 4, but 400 PPM of croton aldehyde was added to the initial reactor charge. The final latex had a viscosity of Bf20=20 300 mPas.

Example 7

Same as example 4, but an effective amount of 360 PPM of propionic aldehyde was added to the initial reactor charge. The final latex after dilution to 61.5% had a viscosity of 20 200 mPas.

Example 8 (Comparison C)

Initial reactor charge consisted of 37.9 parts of a 10% PVOH solution together with 6.7 parts of water. The PVOH used had a weight average of molecular mass distribution of $M_w=149\ 200$ g/Mol and a number average of $Mn=94\ 600$ g/Mol. The average degree of hydrolysis was 91%. pH of the aqueous solution was adjusted to 5.8 by addition of 0.05 parts of a 10% NaOH solution Initial VAC monomer charge was 12.3 parts. Additionally 0.05 parts of a 1% FAS solution were added before starting the feeds 1 and 2.

Feed 1 consisted of 0.82 parts of a 0.25% TBHP solution, metered in for 200 min. Feed 2 consisted of 0.82 parts of a 0.38% SFS solution which was fed parallel to feed 1. Feed 3 consisted of 36.6 parts of VAC monomer which was fed in for 160 min. Feed 4 consisted of 0.3 parts of N-methylol acryl amide together with 4.3 parts of water. This was fed parallel to feed 3.

Post polymerization was done by feeds 5 and 6, consisting of 0.1 parts of a 10% tBHP solution and 0.1 parts of a 10% SFS solution, respectively. The resulting latex (100 parts) provided a solid content of 53% for 100% monomer conversion Reaction was executed as given above. The final latex, diluted to 50% solids, had a Brookfield viscosity of Bf20=5 920 mPas.

Example 9

Same as example 8, but 25 PPM of MPA was fed within feed 4 during the reaction. The final latex, diluted to 50%, had a Brookfield viscosity Bf20=5 730 mPas.

Example 10

Same as example 8, but 45 PPM of MPA were fed within feed 4 during the reaction. The final latex, diluted to 50%, had a Brookfield viscosity Bf20=6 090 mnPas.

Example 11

Same as example 8, but 90 PPM of MPA were fed within feed 4 during the reaction. The final latex, diluted to 50%, had a Brookfield viscosity Bf20=6 670 mnPas.

Example 12 (Comparison D)

Same as example 8, but 180 PPM of MPA were fed within feed 4 during the reaction. The final latex, diluted to 50%, had a Brookfield viscosity Bf20=7 530 mPas.

Example 13 (Comparison E)

Same as example 8, but 360 PPM of MPA were fed within feed 4 during the reaction. The final latex, diluted to 50%, had a Brookfield viscosity Bf20=6 870 mPas.

Example 14 (Comparison F)

Same as example 8, but 720 PPM of MPA were fed within feed 4 during the reaction. The final latex, diluted to 50%, had a Brookfield viscosity Bf20=5 400 mPas.

Example 15 (Comparison G)

Same as example 8, but instead of a anchor type stirrer a cross-beam type stirrer with inclined blades was used at 400 RPM. The final latex, diluted to 50% had a Brookfield viscosity Bf20=9 800 mPas. The rheological behavior clearly indicated shear thickening with a negative shear thinning factor SF.

Example 16

Same as example 15, but 25 PPM of MPA was fed within feed 4 during the reaction. The final latex, diluted to 50%, had a Brookfield viscosity Bf20=8 420 mPas. Shear thickening behavior of example 15 was converted to shear thinning behavior.

Example 17 (Comparison H)

Initial reactor charge consisted of 37.1 parts of a 10% PVOH solution together with 6.9 parts of water. The same PVOH was used as in example 16. pH of the aqueous solution was adjusted to 5.8 by addition of 0.01 parts of a 10% NaOH solution. Initial VAC monomer charge was 12 parts. Additionally 0.05 parts of a 1% FAS solution were added just before start of feeds 1 and 2.

Feed 1 consisted of 2 parts of a 0.25% tBHP solution, metered in for 200 min. Feed 2 consisted of 2 parts of a 0.38% SFS solution which was fed parallel to feed 1. Feed 3 consisted of 35.83 parts of VAC monomer and was metered in for 160 min. Feed 4 consisted of 0.9 parts of N-methylol acryl amide together with 3 parts of water. This was fed parallel to feed 3.

Post polymerization was done by feeds 5 and 6, consisting of 0.1 parts of a 10% tBHP solution and 0.1 parts of a 10% SFS solution, respectively. The resulting latex (100 parts) provided a solid content of 52.5% for 100% monomer conversion. Reaction was executed as given above. The final latex, diluted to 50% solids, had a Brookfield viscosity of Bf20=16 730 mPas. Rheological behavior indicated strong shear thickening with a negative shear thinning factor SF.

Example 18

Same as example 17, but 25 PPM of MPA was fed within feed 4 during the reaction. Final latex, diluted to 50%, had a Brookfield viscosity Bf20=10 060 mPas. The shear thickening behavior of example 17 was converted to shear thinning behavior.

Example 19

Same as example 18, but monomer feed 3 comprised by 95% of VAC and 5% of VeoVa9 monomer (ast supplied by Shell). The final latex, diluted to 50% solids, had a Brookfield viscosity of Bf20=9 050 mPas.

Example 20 (Comparison I)

Same as example 17, but monomer feed 3 comprised by 85% of VAC and 15% of VeoVa9 monomer. The final latex, diluted to 50% solids, had a Brookfield viscosity of Bf20=10 800 mpas.

Example 21

Same as example 20, but 25 PPM of MPA was fed within feed 4 during the reaction. The final latex, diluted to 50% solids, had a Brookfield viscosity of Bf20=8 660 mpas.

Example 22

Same as example 21, but NMA content in feed 3 was raised from 0.9 parts to 1.05 parts. The final latex, diluted to 50% solids, had a Brookfield viscosity of Bf20=8 000 mnPas.

TABLE 1

Latex and Adhesive Performance

| Example | CTA PPM | final particle size nm | K Value | s.c. % | Bf20 mPas | SF | setting speed paper AZG s | setting speed wood 2.5 min N/mm² | cohesion wood 70° C. N/mm² | cohesion wood 80° C. N/mm² |
|---|---|---|---|---|---|---|---|---|---|---|
| 1 A | 0 | 1187 [1] | 115 | 56 | 2600 | 0.65 | 6.0 | — | 4.6 | — |
| 2 | 12.5 [A] | 932 [1] | 134 | 56 | 5700 | 1.13 | 3.8 | — | 4.4 | — |
| 3 | 25.0 [A] | 907 [1] | 132 | 56 | 6500 | 1.19 | 3.0 | — | 4.3 | — |
| 4B | 0 | 1551 [2] | 112 | 65 | 33500 | 0.80 | 5.7 | — | 4.5 | — |
| 5 | 200 [B] | 1357 [2] | 113 | 65 | 20500 | 0.92 | 2.7 | — | 4.5 | — |
| 6 | 400 [B] | 1112 [2] | 107 | 65 | 20300 | 1.02 | 3.7 | — | 4.2 | — |
| 7 | 360 [C] | 1283 [2] | 96 | 61.5 | 20200 | 1.45 | 3.5 | — | 4.0 | — |
| 8C | 0 | 935 [1] | 136 | 50 | 5920 | 0.25 | — | 1.5 | — | 7.2 |
| 9 | 25 [A] | 822 [1] | 142 | 50 | 5730 | 0.30 | — | 1.9 | — | 7.0 |
| 10 | 45 [A] | 777 [1] | 135 | 50 | 6090 | 0.45 | — | 2.0 | — | 7.2 |
| 11 | 90 [A] | 760 [1] | 117 | 50 | 6670 | 0.54 | — | 2.0 | — | 6.5 |
| 12 D | 180 [A] | 743 [1] | 102 | 50 | 7530 | 0.64 | — | 2.1 | — | 5.5 |
| 13 E | 360 [A] | 1050 [1] | 91 | 50 | 6870 | 0.39 | — | 2.3 | — | 5.1 |
| 14 F | 720 [A] | 1045 [1] | 76 | 50 | 5400 | 0.40 | — | 2.0 | — | 5.2 |
| 15 G | 0 | 1440 [1] | 134 | 50 | 9800 | −0.16 | — | 1.5 | — | 7.2 |
| 16 | 25 [D] | 1020 [1] | 145 | 50 | 8420 | 0.15 | — | 1.8 | — | 7.3 |
| 17 H | 0 | 1950 [2] | 136 | 50 | 16730 | −0.24 | — | 1.1 | — | 7.4 |
| 18 | 25 [A] | 1050 [2] | 131 | 50 | 10060 | 0.21 | — | 2.0 | — | 7.5 |
| 19 | 25 [A] | 1236 [2] | 123 | 50 | 9050 | 0.15 | — | 2.4 | — | 7.2 |
| 20 I | 0 | 1176 [2] | 119 | 50 | 10800 | 0.08 | — | 1.7 | — | 6.8 |
| 21 | 25 [A] | 1226 [2] | 124 | 50 | 8660 | 0.21 | — | 2.8 | — | 7.1 |
| 22 | 25 [A] | 1170 [2] | 126 | 50 | 8000 | 0.31 | — | 2.2 | — | 7.1 |

[A] CTA 3-mercato propionic acid
[B] CTA croton aldehyde
[C] CTA propion aldehyde
[D] CTA 2-mercapto propionic acid
[1] particle size median $x_{3,50}$ from COULTER LS 230 analysis
[2] particle size weight average from COULTER N4 analysis

TABLE 2

Wood Glue Performance

| Example | D3-value N/mm² | D4-value N/mm² |
|---|---|---|
| 9 | 2.8 | — |
| 10 | 3.0 | — |
| 11 | 2.9 | — |
| 16 | 2.3 | — |
| 18 | 3.4 | 3.1 |
| 19 | 3.9 | 3.0 |
| 21 | 5.3 | 4.1 |
| 22 | 5.5 | 4.0 |

In Table 1 the results of the 13 examples, and 9 comparative examples are summarized. Table 2 summarizes results obtained for the water resistance of the bond when base emulsions obtained in the framework of this invention were formulated as wood glues.

Examples 2, 3, 5, 6, and 7 represent VAC homopolymer latices of this invention prepared in the presence of PVOH. The comparison with Example 1 reveals that the use of trace amounts of CTA results in the following: the setting speed measured as AZG is considerably increased, the shear thinning may be adjusted within the required range, cohesion stays within its desired range and K-value is slightly increased or remains about unchanged.

Examples 9, 10, 11, 16, 18, 19, 21, and 22 represent VAC co-polymers suitable as base of high performance water resistant D3 wood glues. Comparing Example 16 with 15G, and 18 with 17H it is obvious that the use of trace amounts of a CTA may even convert a shear thickening behavior (SF<0) to a shear thinning one (SF>0) within the desired range of SF. At the same time the setting speed is improved without impairing cohesion.

Additionally, the results of the comparative Examples 12D, 13E, 14F demonstrate, that use of a CTA above the limits of this invention in accordance with the prior art will result in a much higher decrease of the average molecular weight, expressed as the K-value, and will thereby contribute to an unacceptable loss or reduction of cohesion.

Examples 21 and 22 represent VAC co-polymers suitable as a base of high performance boiling water resistant D4 wood glues. Comparing Examples 21 and 22 with 20L both the setting speed and the shear thinning are improved by use trace amounts of a CTA.

We claim:

1. Vinyl acetate based polymer latex composition obtained by emulsion polymerization of:
    (a) polyvinyl alcohol,
    (c) a monomer mixture comprising vinyl acetate, and (d) optionally one or more additional co-monomer(s),
in presence of (c) 0.0001–0.05 wt. % of a chain transfer agent, based on total monomer weight, said vinyl acetate based polymer latex composition having a weight average particle size ≧400 nm and a higher shear thinning factor than the vinyl acetate based polymer latex composition (a), (b) and (d) obtained in the absence of the chain transfer agent (c).

2. Composition according to claim 1, wherein emulsion polymerization is carried out in presence of 0.001 to 0.05 wt. % of a chain transfer agent selected from the group consisting of aldehydes and chain transfer agents having a similar chain transfer constant with regard to vinyl acetate as the monomer.

3. Composition according to claim 1, wherein emulsion polymerization is carried out in presence of 0.0001 to 0.01 wt. % of a chain transfer agent selected from the group consisting of thiols, mercapto acids, and chain transfer agents having a similar chain transfer constant with regard to vinyl acetate as the monomer.

4. Composition according to claim 1, having a shear thinning factor of about 1,2 to 3,5 times the shear thinning factor of a latex composition obtained in absence of the chain transfer agent or wherein the shear thinning factor is shifted from negative values to positive values.

5. Composition according to claim 1, wherein the latex weight average particle size is about 60 to 95% the weight average particle size of a latex composition obtained in the absence of the chain transfer agent.

6. Composition according to claim 1, wherein the chain transfer agent is selected from the group consisting of $C_{2-5}$-aldehydes, $C_{2-5}$-thiols, $C_{2-5}$-mercaptoacids, and mixtures thereof.

7. Composition according to claim 2, wherein the chain transfer agent is selected from the group consisting of croton aldehyde, propionic aldehyde, and mixtures thereof.

8. Composition according to claim 3, wherein the chain transfer agent is selected from the group consisting of 2-mercapto propionic acid, 3-mercapto propionic acid, and mixtures thereof.

9. Composition according to claim 1, wherein the amount of vinyl acetate is in the range of 100 wt. % to 60.00 wt. %, based on total monomer weight.

10. Composition according to claim 1, wherein the polyvinyl alcohol has a degree of hydrolysis from 60 to 99 mole-% and is present in an amount of 3 wt. % to 12 wt. %, based on total monomer weight.

11. Composition according to claim 1, wherein the vinyl acetate based polymer latex composition further comprises one or more co-monomers selected from the group consisting of one or more vinyl ester(s), other than vinyl acetate, one or more post-crosslinking monomer(s), one or more ethylenically unsaturated acid(s) or anhydride(s) thereof, one or more acrylic monomer(s), and mixtures thereof.

12. Composition according to claim 11, wherein the one or more vinyl ester(s) are selected from the group consisting of vinyl propionate, vinyl pivalate, vinyl 2-ethyl hexanoate, diisopropyl maleate, diisopropyl fumarate, versa tic acid vinyl esters having 9 to 10 carbon atoms from the carbonic acid group, and mixtures thereof, the one or more additional vinyl ester(s) being present in an amount of up to 40 wt %, based on total monomer weight.

13. Composition according to claim 11, wherein the one or more post-crosslinking monomer(s) are selected from N-alkoyl derivatives of an amide of a α,β-ethylenically unsaturated carboxylic acid.

14. Composition according to claim 13, wherein the post-crosslinking monomer is N-methylol acrylamide.

15. Composition according to claim 8, wherein the vinyl acetate based polymer latex composition is a copolymer of vinyl acetate/N-methylol acrylamide, optionally further including versa tic acid vinyl ester having 9 to 10 carbon atoms from the carbonic acid group.

16. Process of manufacture of a vinyl acetate based polymer latex composition having a weight average particle size ≧400 nm, including emulsion polymerization of vinyl acetate in the presence of polyvinyl alcohol, optionally together with one or more additional co-monomer(s), wherein the emulsion polymerization is carried out in the presence of 0.0001 wt. % to 0.05 wt. % chain transfer agent, based on total monomer weight.

17. Process according to claim 16, wherein emulsion polymerization is carried out in presence of 0.001 to 0.05 wt. % of a chain transfer agent selected from the group consisting of aldehydes and chain transfer agents having a similar chain transfer constant with regard to vinyl acetate as the monomer.

18. Process according to claim 16, wherein emulsion polymerization is carried out in presence of 0.0001 to 0.01 wt. % of a chain transfer agent selected from the group consisting of thiols, mercapto acids, and chain transfer agents having a similar chain tansfer constant with regard to vinyl acetate as the monomer.

19. Process according to claim 17, wherein the chain transfer agent is selected from the group consisting of croton aldehyde, propionic aldehyde or mixtures thereof.

20. Process according to claim 18, wherein the chain transfer agent is selected from the group consisting of 2-mercapto propionic acid, 3-mercapto propionic acid or mixtures thereof.

21. Process according to claim 16, wherein the vinyl acetate based polymer is a co-polymer of vinyl acetate/N-methylol acrylamide, optionally fierier including versatic acid vinyl ester having 9 or 10 carbon atoms from the carbonic acid group, and the chain transfer agent is mercapto propionic acid.

22. Adhesive, comprising the vinyl acetate based polymer latex composition according to claim 1.

23. Adhesive, comprising the vinyl acetate based polymer latex composition according to claim 15.

24. Adhesive according to claim 22, for use in paper and packaging, comprising a vinyl acetate homopolymer latex composition.

25. Adhesive according to claim 23 for use as a wood glue.

* * * * *

UNITED STATES PATENT AND TRADEMARK OFFICE
CERTIFICATE OF CORRECTION

PATENT NO. : 6,794,466 B2  
DATED : September 21, 2004  
INVENTOR(S) : Helmut Zecha, Rudolf Weissgerber and Francis Petrocelli It is certified that error appears in the above-identified patent and that said Letters Patent is hereby corrected as shown below:

Column 18,  
Line 53, delete "(c)" and insert -- (b) -- therefor.

Column 19,  
Line 44, delete "versa tic" and insert -- versatic -- therefor.

Column 20,  
Line 6, delete "versa tic" and insert -- versatic -- therefor.  
Line 26, delete "tansfer" and insert -- transfer -- therefor.  
Line 37, delete "fierier" and insert -- further -- therefor.

Signed and Sealed this

Eleventh Day of January, 2005

JON W. DUDAS  
*Director of the United States Patent and Trademark Office*